(12) United States Patent
Lee et al.

(10) Patent No.: US 7,889,447 B2
(45) Date of Patent: Feb. 15, 2011

(54) READBACK SIGNAL-BASED HEAD-DISC CONTACT DETECTION USING AM/FM DEMODULATION

(75) Inventors: Juil Lee, Sewickley, PA (US); Michael Ting, Pittsburgh, PA (US); Mark David Bedillion, Allison Park, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 227 days.

(21) Appl. No.: 12/353,564

(22) Filed: Jan. 14, 2009

(65) Prior Publication Data

US 2010/0177429 A1 Jul. 15, 2010

(51) Int. Cl.
*G11B 20/06* (2006.01)
(52) U.S. Cl. ....................................................... 360/29
(58) Field of Classification Search ................... 360/29, 360/31, 75, 72.3; 324/212; 386/23, 93; 329/320; 369/47.17, 47.18
See application file for complete search history.

(56) References Cited

U.S. PATENT DOCUMENTS

| | | | | |
|---|---|---|---|---|
| 3,805,285 A | * | 4/1974 | Kinjo et al. | 386/93 |
| 4,403,264 A | * | 9/1983 | Watatani et al. | 386/93 |
| 4,580,174 A | * | 4/1986 | Tokunaka | 386/23 |
| 4,692,914 A | * | 9/1987 | Yasumura et al. | 369/47.18 |
| 4,815,061 A | * | 3/1989 | Yasumura et al. | 369/47.17 |
| 5,461,339 A | * | 10/1995 | Kawano | 329/320 |
| 5,539,592 A | | 7/1996 | Banks et al. | |
| 5,545,989 A | * | 8/1996 | Tian et al. | 324/212 |
| 5,594,595 A | * | 1/1997 | Zhu | 360/31 |
| 5,680,265 A | | 10/1997 | Noguchi | |
| 5,742,446 A | * | 4/1998 | Tian et al. | 360/75 |
| 6,008,640 A | | 12/1999 | Tan et al. | |
| 6,052,243 A | | 4/2000 | Shimada | |
| 6,097,559 A | | 8/2000 | Ottesen et al. | |
| 6,160,675 A | * | 12/2000 | Shudo et al. | 360/72.3 |
| 6,600,622 B1 | | 7/2003 | Smith | |
| 7,190,547 B2 | | 3/2007 | Khurshudov et al. | |
| 7,215,495 B1 | | 5/2007 | Che et al. | |
| 7,292,401 B2 | | 11/2007 | Shen et al. | |
| 7,362,534 B1 | | 4/2008 | Schreck et al. | |
| 7,423,830 B2 | | 9/2008 | Ma et al. | |
| 2006/0146432 A1 | | 7/2006 | Khurshudov et al. | |
| 2007/0230018 A1 | | 10/2007 | Schreck et al. | |

OTHER PUBLICATIONS

G. J. Smith, "Dynamic In-Situ Measurements of Head-to-Disk Spacing", IEEE Transactions on Magnetics, vol. 35, No. 5, Sep. 1999, pp. 2346-2351.

(Continued)

*Primary Examiner*—Fred Tzeng
(74) *Attorney, Agent, or Firm*—Robert P. Lenart, Esq.; Pietragallo Gordon Alfano Bosick & Raspanti, LLP

(57) ABSTRACT

A method includes: producing a readback signal using a recording head positioned adjacent to a recording medium, amplitude demodulating the readback signal to produce an amplitude demodulated signal, frequency demodulating the readback signal to produce a frequency demodulated signal, and using the amplitude demodulated signal and the frequency demodulated signal to determine contact of the recording head with the recording medium. An apparatus that can be used to implement the method is also provided.

19 Claims, 8 Drawing Sheets

OTHER PUBLICATIONS

Z.-M. Yuan et al., "Absolute Head Media Spacing Measurement In Situ", IEEE Transactions on Magnetics, vol. 42, No. 2, Feb. 2006, pp. 341-343.

J. Xu et al., "Head-Medium Spacing Measurement Using the Read-Back Signal", IEEE Tranactions on Magnetics, vol. 42, No. 10, Oct. 2006, pp. 2486-2488.

Y.-T. Hsia et al., "A Novel Metrology Technique to Capture the Flying Dynamics of Air Bearing Slider With and Without Induced Contact", 2 pgs.

Y. Tang et al., "Overview of Fly Height Control Applications in Perpendicular Magnetic Recording", IEEE Transactions on Magnetics, vol. 43, No. 2, Feb. 2007, pp. 709-714.

* cited by examiner

|  | DRIVE 1 | | DRIVE 2 | | DRIVE 3 | |
| --- | --- | --- | --- | --- | --- | --- |
|  | OD | MD | OD | MD | OD | MD |
| FM DEMOD. (dB) | 14.6 (90kHz) | 10.2 (133kHz) | 13.6 (75kHz) | 2 (235kHz) | 27.4 (90kHz) | 20.8 (140kHz) |
| AM DEMOD. (dB) | -4 (90kHz) | 10.7 (133kHz) | 2.5 (200-600kHz) | 15 (235kHz) | 13.1 (200-600kHz) | 12 (200-600kHz) |
| dPES (dB) | 6 (2.4dB 1σ noise) | 5.9 (3.3dB 1σ noise) | 15 (3.3dB 1σ noise) | 9.9 (2.7dB 1σ noise) | 33 (3dB 1σ noise) | 10 (4dB 1σ noise) |

FIG. 10

READBACK SIGNAL-BASED HEAD-DISC CONTACT DETECTION USING AM/FM DEMODULATION

BACKGROUND

In disc drive data storage devices a slider, including a recording head, flies over the disc and is separated from the disc by an air bearing. The rapid increase in the areal density of magnetic recording technology requires a significant decrease in the fly height (FH) of magnetic head sliders. As the FH decreases, an accurate control of FH under various environmental conditions such as temperature, altitude and humidity becomes even more important to ensure a reliable head-disc interface.

A known approach to FH control is to use an integrated heating element (called a "heater") as an actuator for controlling the fly height in combination with a number of ways to measure the FH. As for the FH measurement, a Wallace equation-based harmonic ratio type approach (called 'AR/HR' method) has been used to provide a relative FH estimation together with a position error signal-based head-disc contact detection (called the "dPES" method) as a reference FH point.

Although dPES-based contact detection has been successfully implemented in disc drives, it would be desirable to provide an alternative contact detection scheme with improved results at small skew angles, and/or with reduced head-disc contact time.

SUMMARY

In a first aspect, the invention provides a method including: producing a readback signal using a recording head positioned adjacent to a recording medium, amplitude demodulating the readback signal to produce an amplitude demodulated signal, frequency demodulating the readback signal to produce a frequency demodulated signal, and using the amplitude demodulated signal and the frequency demodulated signal to determine contact of the recording head with the recording medium.

In another aspect, the invention provides an apparatus including a recording head positioned adjacent to a recording medium and producing a readback signal, an amplitude demodulator for amplitude demodulating the readback signal to produce an amplitude demodulated signal, a frequency demodulator for frequency demodulating the readback signal to produce a frequency demodulated signal, and circuitry for using the amplitude demodulated signal and the frequency demodulated signal to determine contact of the recording head with the recording medium.

BRIEF DESCRIPTION OF THE DRAWINGS

FIG. 10 is a listing of experimental results for several disc drives.

DETAILED DESCRIPTION OF THE INVENTION

Figure 1:
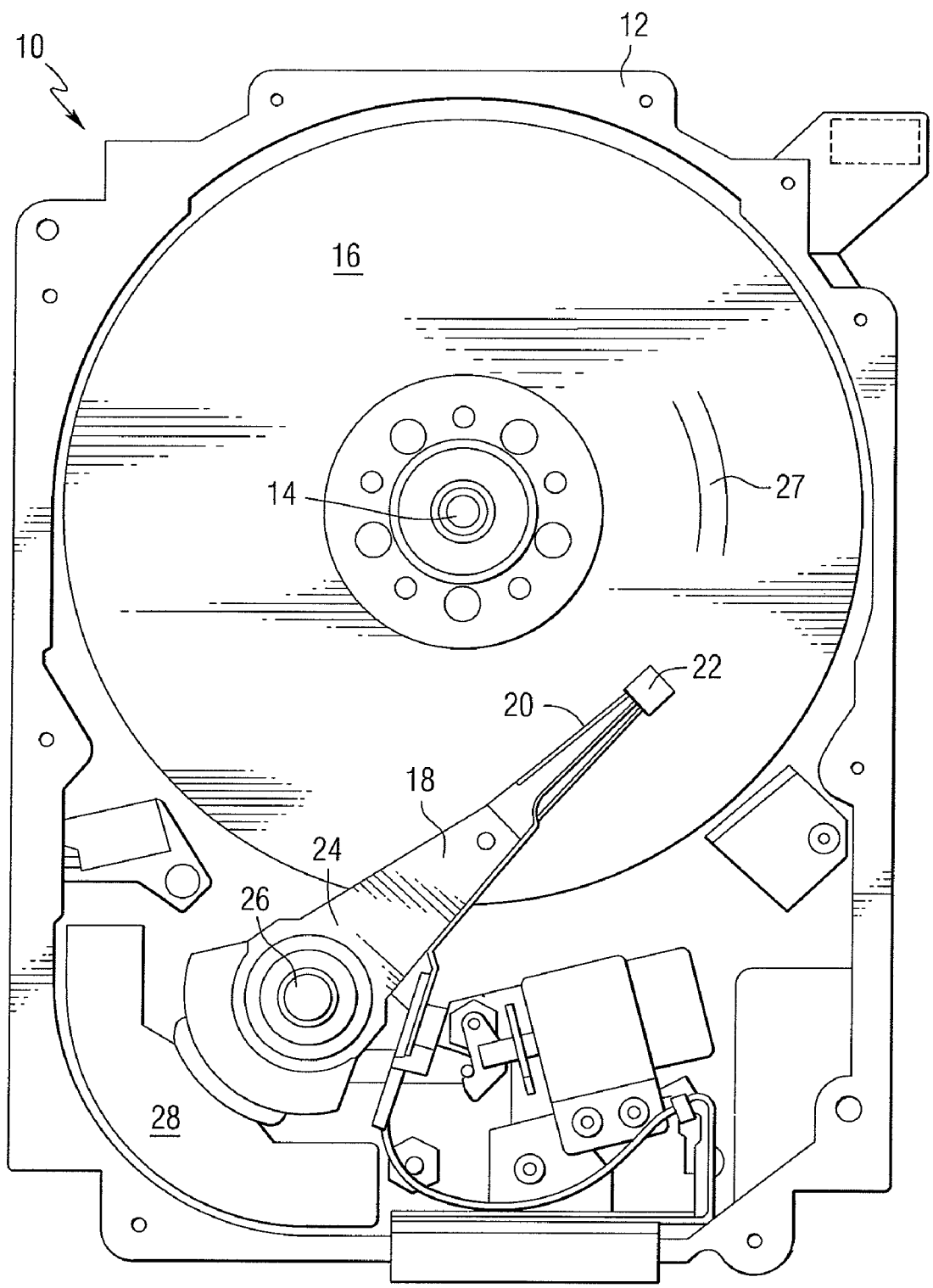
FIG. 1 is a pictorial representation of the mechanical portion of a disc drive that can be constructed in accordance with an aspect of the invention.

FIG. 1 is a pictorial representation of the mechanical portion of a disc drive 10 that can operate in accordance with an aspect of the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 over a desired sector of the disc 16. Data is stored in a plurality of concentric tracks 27 on the storage medium. Command and control electronics for the disc drive are provided on a printed circuit board (PCB) mounted in the housing.

Figure 2:
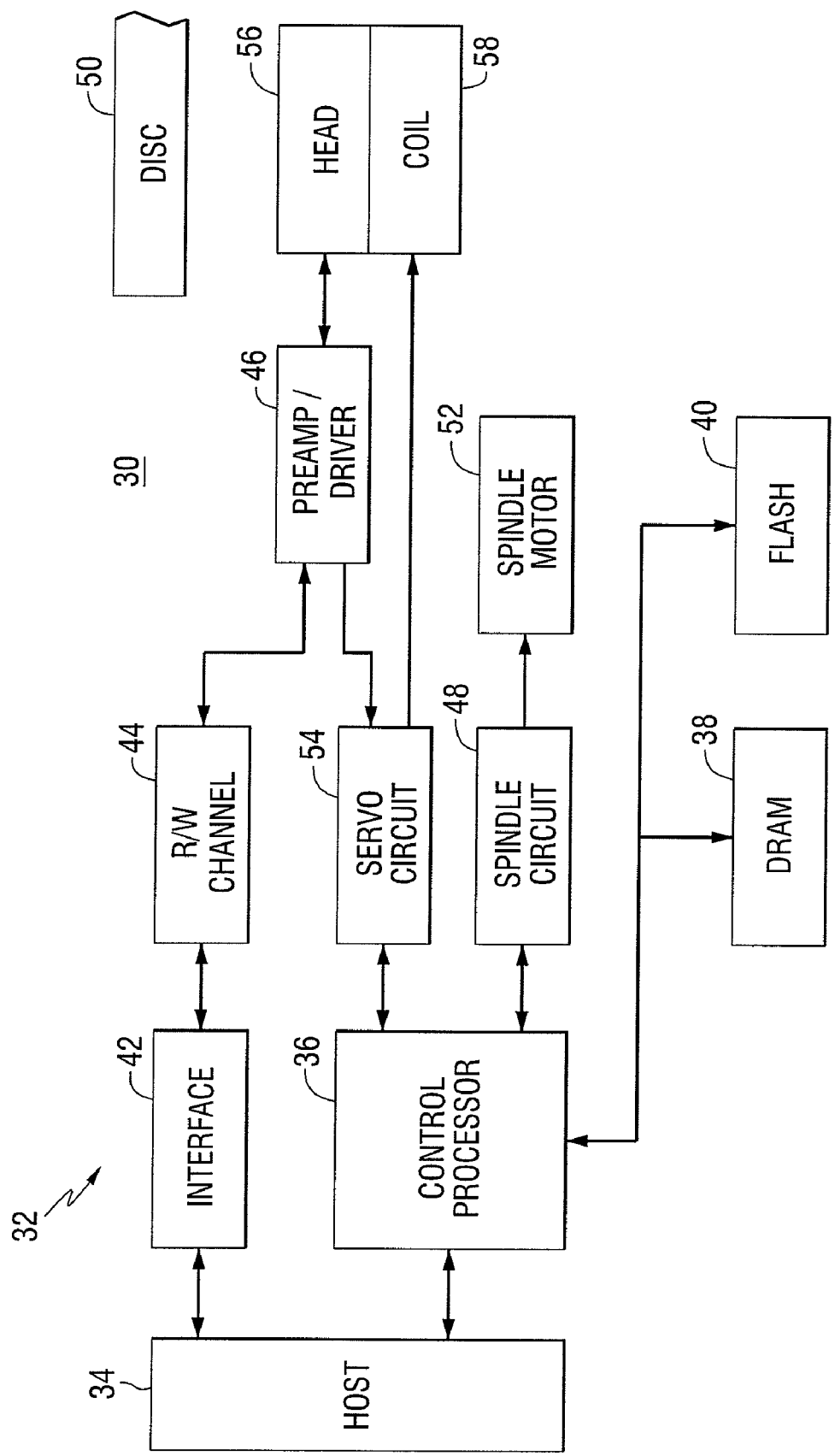
FIG. 2 is a block diagram of a disc drive that can include the components of FIG. 1.

A functional block diagram of a system including a disc drive 30, having control circuitry 32, is provided in FIG. 2. A host computer 34 provides a stream of requests to the disc drive. A disc drive control processor 36 controls the operation of the disc drive 30 in accordance with programming and information stored in dynamic random access memory (DRAM) 38 and non-volatile flash memory 40.

Data to be stored by the disc drive are transferred from the host computer 34 to an interface circuit 42 during data transfer operations. The interface circuit includes a data buffer for temporarily buffering the data, a sequencer for directing the operation of a read/write channel 44, and a preamp/driver circuit 46. A spindle circuit 48 is provided to control the rotation of the discs 50 by the spindle motor 52.

A servo circuit 54 is provided to control the position of one or more recording heads 56 relative to the discs 50 as part of a servo loop established by the head 56, the preamp/driver 46, the servo circuit 54, and the coil 58 that controls the position of an actuator arm. The servo circuit 54 includes a digital signal processor (DSP) which is programmed to carry out two main types of servo operation: seeking and track following.

In one aspect, this invention provides a method and apparatus for detecting a head-disc contact in a data storage device that includes a recording head in a slider that flies over the surface of a data storage disc. The recording head is used to write and/or read data along tracks on the disc.

Head-disc contact causes slider motion in all directions; namely, not only in a cross-track direction but equally, or more significantly, in vertical and down-track directions depending upon the conditions of head-disc contact. Slider motion in the vertical and down-track directions will affect the readback signal in the form of amplitude modulation (AM) and frequency modulation (FM), respectively. In one aspect, the invention demodulates the readback signal with respect to both AM and FM modulation to obtain a sensitive signal for contact detection. Thus, the method described below is referred to as AM/FM demodulation-based contact detection.

Figure 3:
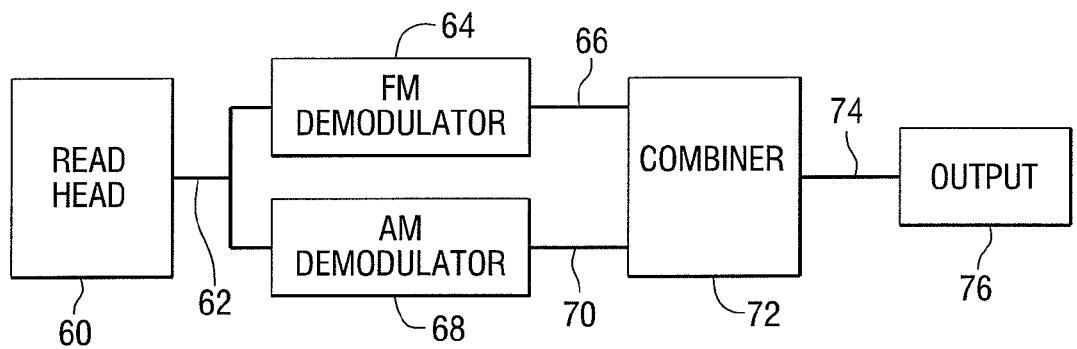
FIG. 3 is a block diagram of an apparatus for processing signals to produce a contact detection signal.

FIG. 3 is a block diagram of an apparatus for processing signals to produce a contact detection signal. A read head 60 is used to produce a readback signal on line 62, which is representative of information stored on a storage medium. In one example, the information stored on the storage medium can be a single tone stored as a periodic bit sequence. The readback signal is demodulated by an FM demodulator 64 to produce a first demodulated signal on line 66. The readback signal is also demodulated by an AM demodulator 68 to produce a second demodulated signal on line 70. The first and second demodulated signals are then combined in a combiner 72 to produce a combined signal on line 74 that is delivered to an output 76.

Figure 4:
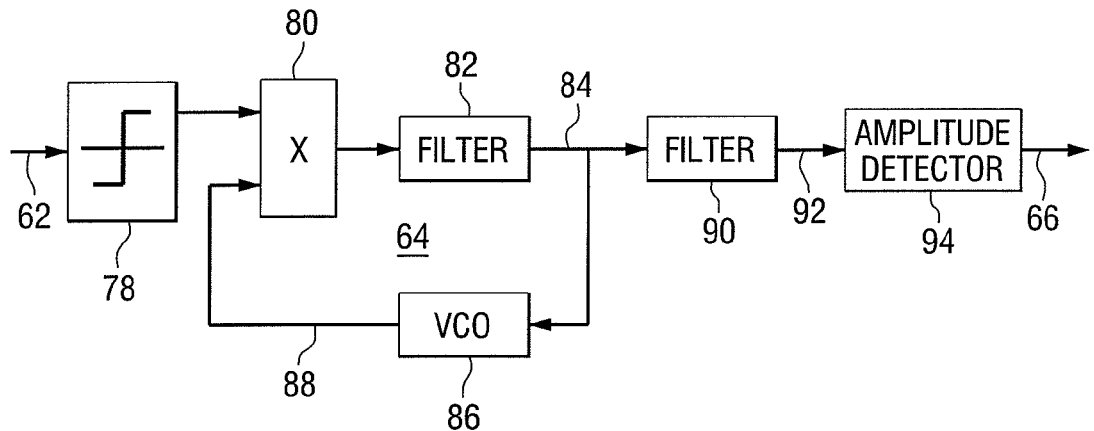
FIG. 4 is a schematic diagram of an FM demodulator.

FIG. 4 is a schematic diagram for an embodiment of the FM demodulator 64. The readback signal received on line 62 passes through a sign detector or a zero-crossing detector 78 and is coupled to a mixer 80 together with a local oscillator signal on line 88 that is phase, as well as frequency, synchronous to the readback signal 62. The output of the mixer is filtered by a first filter 82 to produce a first filtered signal, which is a timing error signal, on line 84. A voltage controlled oscillator 86 produces the local oscillator signal in response to the first filtered signal. The local oscillator signal is combined with the readback signal in the mixer, thus providing a phase locked loop. In one example, the first filer can be an RC first order lowpass filter with a bandwidth of about 100 kHz.

Figure 6:
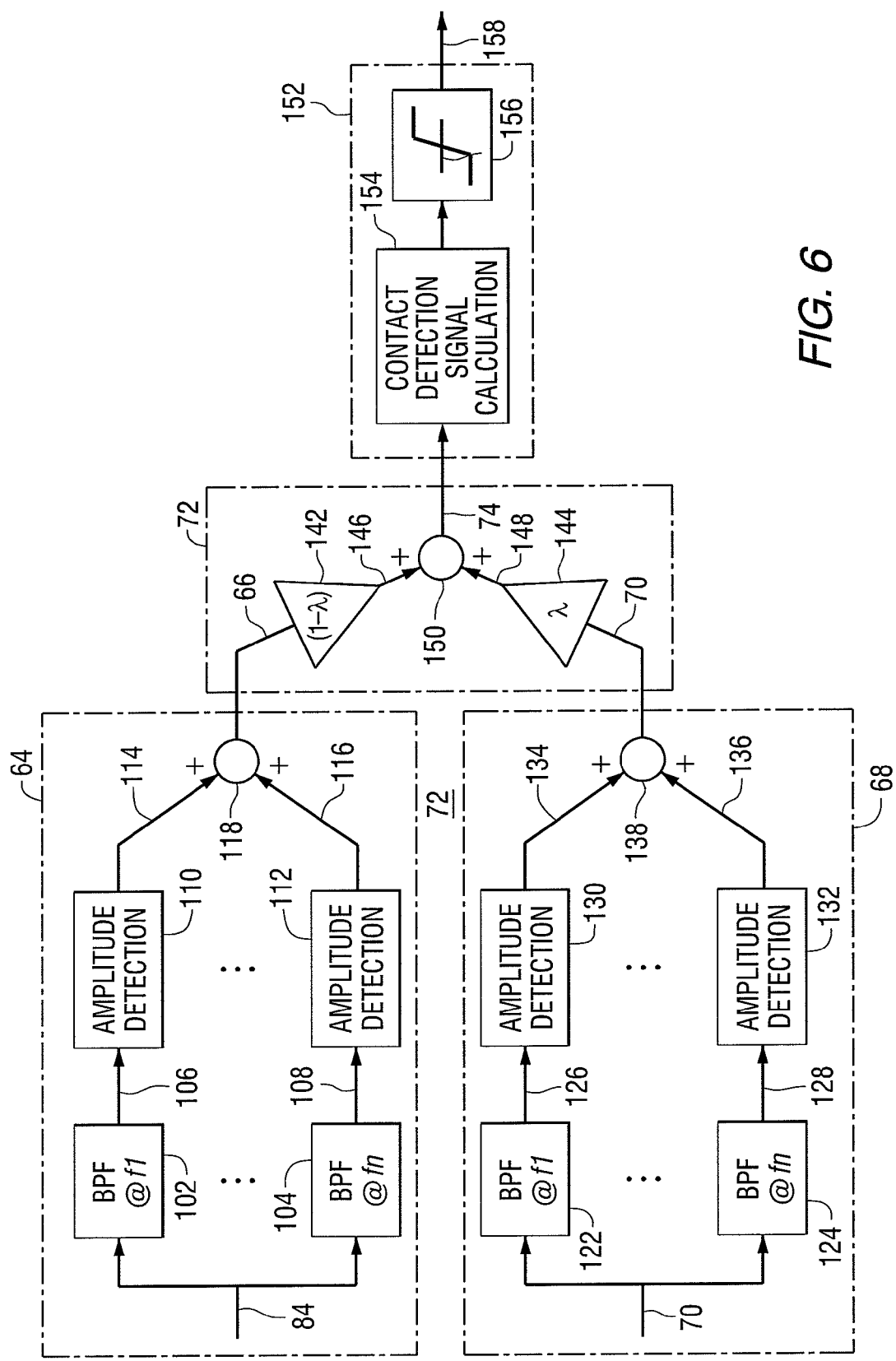
FIG. 6 is a schematic diagram of a circuit for combining demodulated signals.

The first filtered signal is filtered by a second filter 90 to produce a second filtered signal on line 92. In this example, the second filter is a Butterworth second order bandpass filter with a passband of about 70 kHz to about 110 kHz. The second filtered signal is further processed to determine its amplitude (such as the rms value) as shown in block 94, and to produce the first demodulated signal on line 66. Note that the center frequency of the bandpass filter 90 is tuned according to the resonance frequency of the recording head in the down-track direction during head-disc contacts. To cover more than one resonance frequency, a plurality of bandpass filters 102, 104 can be used as shown in FIG. 6.

Figure 5:
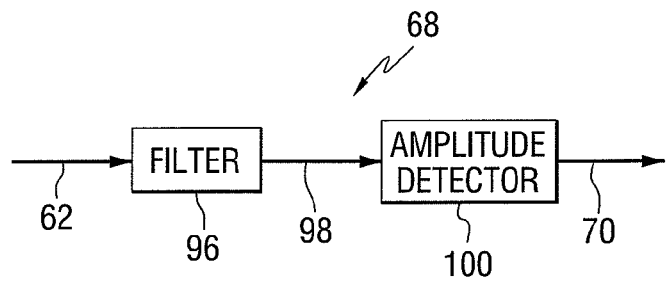
FIG. 5 is a schematic diagram of an AM demodulator.

FIG. 5 is a schematic diagram of an AM demodulator 68. The readback signal received on line 62 passes through a bandpass filter 96 to produce a filtered signal on line 98. The filtered signal is further processed to determine its amplitude (such as the rms value) as shown in block 100, and to produce the second demodulated signal on line 70. In one example, the filter is a $4^{th}$ order Butterworth filter with a passband of about 200 kHz to about 600 kHz. Note that the center frequency of the bandpass filter 96 is tuned according to the resonance frequency of the recording head in the vertical direction during head-disc contacts. To cover more than one resonance frequency, a plurality of bandpass filters 122, 124 can be used as shown in FIG. 6.

The demodulated signals 66 and 70 can be used to calculate a contact detection signal according to the formulas:

$$FM_{DEMOD}(RDHTR) = 20\log_{10}\frac{FM\_AMP_{RDHTR}}{FM\_AMP_{NO\_CONTACT}} \quad (1)$$

$$AM_{DEMOD}(RDHTR) = 20\log_{10}\frac{AM\_AMP_{RDHTR}}{AM\_AMP_{NO\_CONTACT}}. \quad (2)$$

In one example, a digital control signal is applied to a digital-to-analog converter (DAC), which converts the digital control signal to an analog voltage that is applied to the reader heater. The digital control signal is adjusted to increase the control voltage until thermal expansion of the reader is sufficient to cause contact between the reader and the disc. In each formula (1) and (2), the amplitude of the AM/FM demodulation at a certain reader heater digital-to-analog converter (DAC) setting ($AM\_AMP_{RDHTR}$ and $FM\_AMP_{RDHTR}$) is compared with a reference amplitude representative of a no head-disc contact condition ($AM\_AMP_{NO\_CONTACT}$ and $FM\_AMP_{NO\_CONTACT}$). The reference values can be obtained, for instance, as the average amplitudes of the AM/FM demodulated signals at the smallest reader heater DAC settings.

FIG. 6 is a schematic diagram of one example of a circuit for combining the demodulated signals to provide a more reliable head-disc contact detection signal as will be explained later. As explained above, in the FM demodulator 64, the timing error signal on line 84 is filtered by a plurality of bandpass filters 102, 104 to produce a plurality of filtered signals on line 106, 108. Each of these filtered signals is amplitude detected as shown in the blocks 110, 112. The detected signals on lines 114, 116 are combined in a summer 118 to produce a down-track head motion estimate signal on line 66.

Likewise, in the AM demodulator 68, the readback signal on line 62 is filtered by a plurality of bandpass filters 122, 124 to produce a plurality of filtered signals on lines 126, 128. Each of these filtered signals is amplitude detected as shown in the blocks 130, 132. The detected signals on lines 134, 136 are combined in a summer 138 to produce a vertical head motion estimate signal on line 70. The down-track head motion estimate signal on line 66 and the vertical head motion estimate signal on line 70 may optionally be scaled as illustrated by scaling circuits 142 and 144 in the combiner 72. The scaled signals on lines 146 and 148 are combined in a summer 150 to produce a combined signal on line 74. The scaling can be implemented by multiplying either the down-track motion estimate or the vertical head motion estimate by a scaling factor λ (having a range of 0 to 1), and multiplying the other estimate by (1-λ). The scaling factor can be changed depending on where the recording head is positioned with respect to the storage medium. More particularly, the scaling factor can be varied with the radial position of the recording head, such that a larger scaling factor is applied to the AM demodulation signal when the recording head is closer to the center of the disc, and a larger scaling factor is applied to the FM demodulation signal when the recording head is farther from the center of the disc.

The combined signal (AM_FM_AMP) is processed to determine a contact detection as shown in block 152. A signal calculation block 154 is used to calculate a contact detection signal (ContactDetect) for a given reader heater setting (RDHTR) as follows:

$$ContactDetect(RDHTR) = 20\log_{10}\frac{AM\_FM\_AMP_{RDHTR}}{AM\_FM\_AMP_{NO\_CONTACT}}. \quad (3)$$

In a manner similar to that of the formulas (1) and (2), the amplitude of the combined signal at a certain reader heater setting ($AM\_FM\_AMP_{RDHTR}$) is compared with reference amplitude representative of a no head-disc contact condition ($AM\_FM\_AMP_{NO\_CONTACT}$). This reference value can be obtained, for instance, as an average amplitude of a plurality of measurements of the combined signal at the smallest reader heater settings.

Finally, the resulting contact detection signal is subjected to a threshold comparison 156 to determine if the magnitude of the contact detection signal exceeds a predetermined threshold. If the threshold is exceeded, a contact indication is output on line 158.

Figure 7:
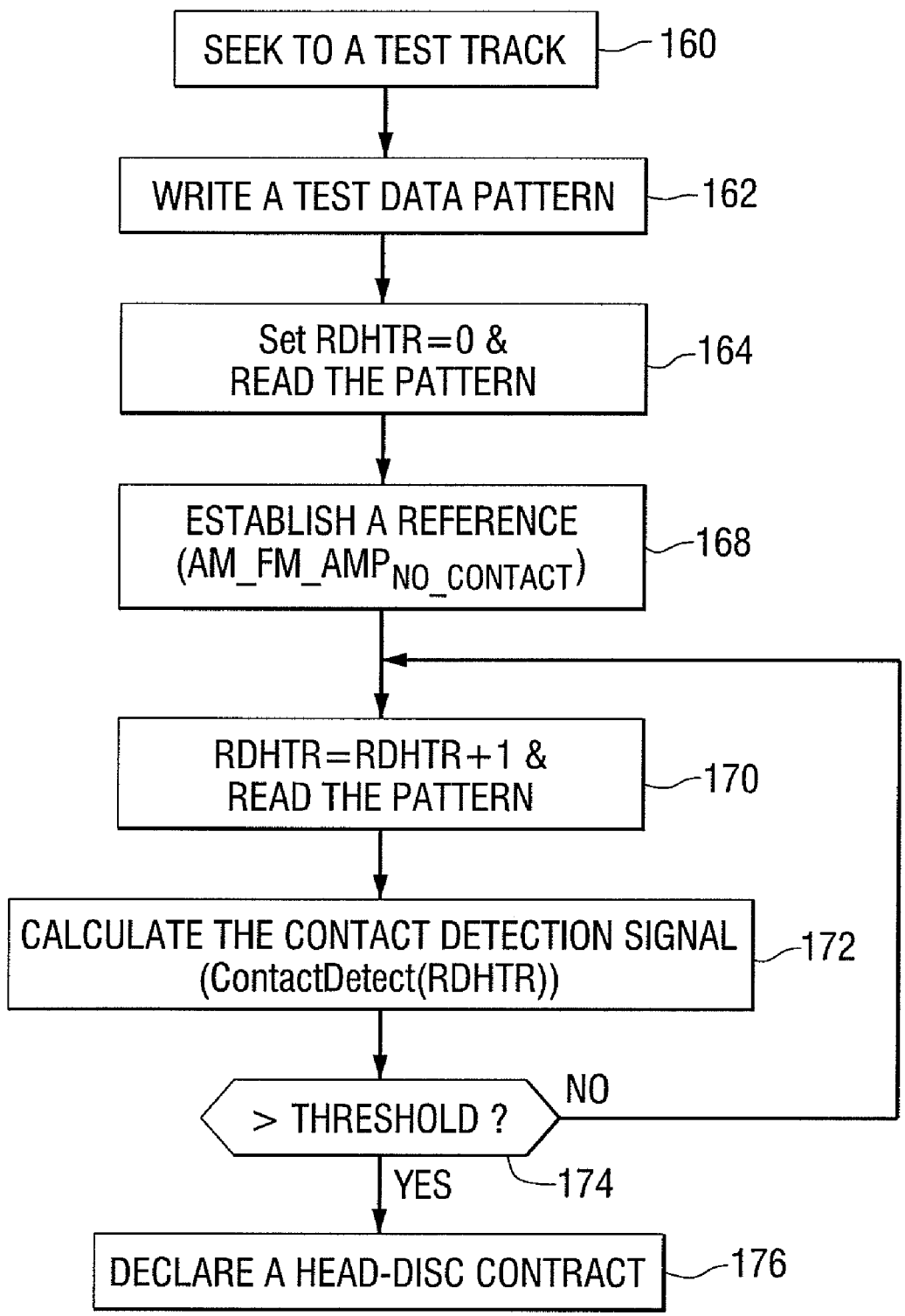
FIG. 7 is a flow diagram that illustrates the method of one aspect of the invention.

One example of implementing a contact detection procedure utilizing the formula (3) is presented in the flow chart in FIG. 7. The procedure illustrated in FIG. 7 begins with a seek operation in which the recording head is moved to a test track (block 160). Then a test data pattern is written to the test track (block 162). Next the read heater control signal is set to zero, and the pattern is read (block 164). Reference values are established for the AM and FM demodulators (block 168). The reference values can be the average of a plurality of AM and FM demodulator signals measured when the recording head is not in contact with the disc.

After AM and FM references are established, the voltage to the read heater is increased by a predetermined increment and the test pattern is read (block 170). Then a contact detection signal is calculated (block 172). The contact detection signal is compared to a threshold as shown in block 174. If the contact detection signal exceeds the threshold, a head-disc contact is declared (block 176). If the contact detection signal does not exceed the threshold, the read heater control signal is increased by the predetermined increment and the test pattern is read again.

The described AM/FM demodulation-based contact detection method has been tested in an actual hard drive, and its performance was compared against the existing dPES method. Data was collected when the recording head was in two radial positions with respect to the disc, one at an outer diameter (OD) and the other at a medium diameter (MD) where the skew angle is close to zero. A single tone was written and then read out at various reader heater DAC settings using a single wedge write and read operation. The sampled readback signal was applied to a software implemented PLL to extract its timing error information, as well as for spectral analysis to observe an amplitude modulation.

The software FM demodulation included an analog PLL followed by a bandpass filter (BPF) and an amplitude detector (RMS calculation), and the AM demodulation included a BPF together with an amplitude detector (RMS calculation). A sign function at the input of the PLL in the FM demodulation was included to decouple any amplitude variations from the frequency variation detection. The final AM and FM demodulation output was converted into a ratio (in dB) of current value with respect to a nominal value (an output average over three measurements during non-contact).

Figure 8:
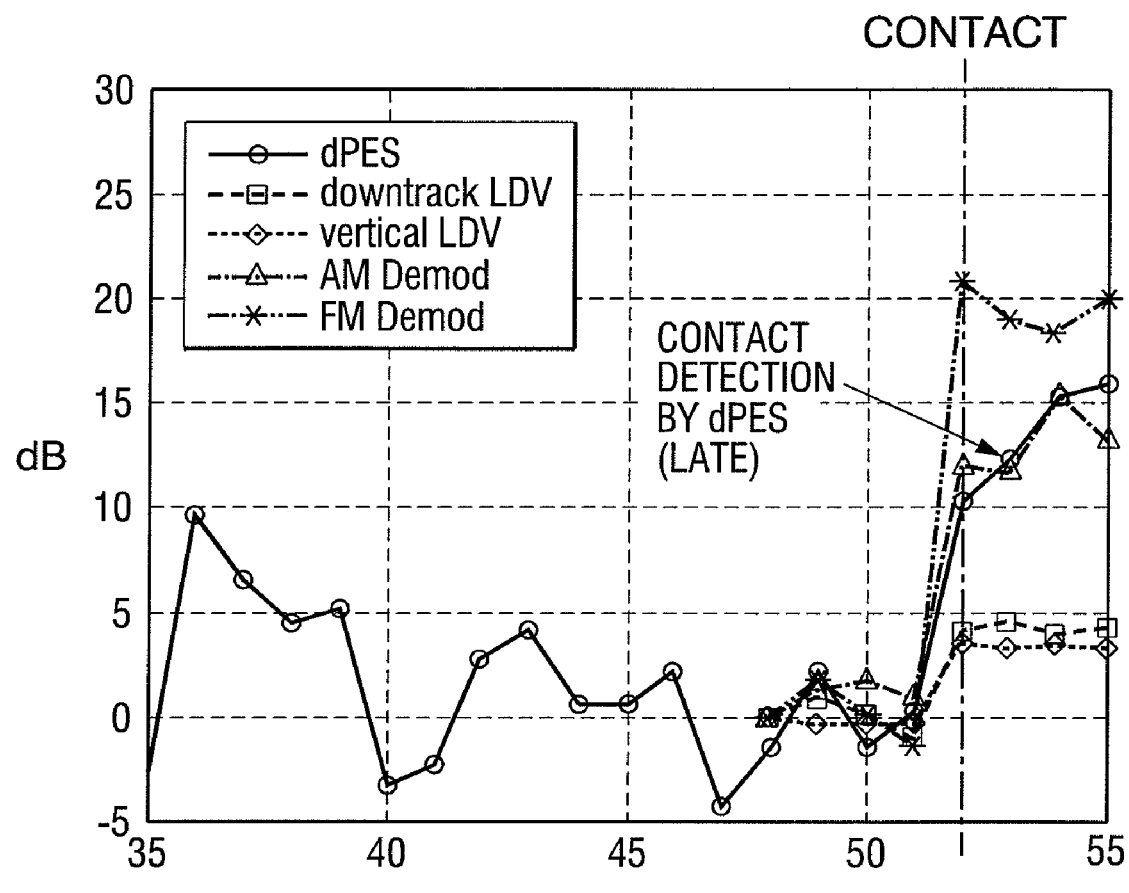
FIGS. 8 and 9 are diagrams of a ratio of detection values to a reference value, versus DAC value for controlling voltage applied to read heater.
Figure 9:
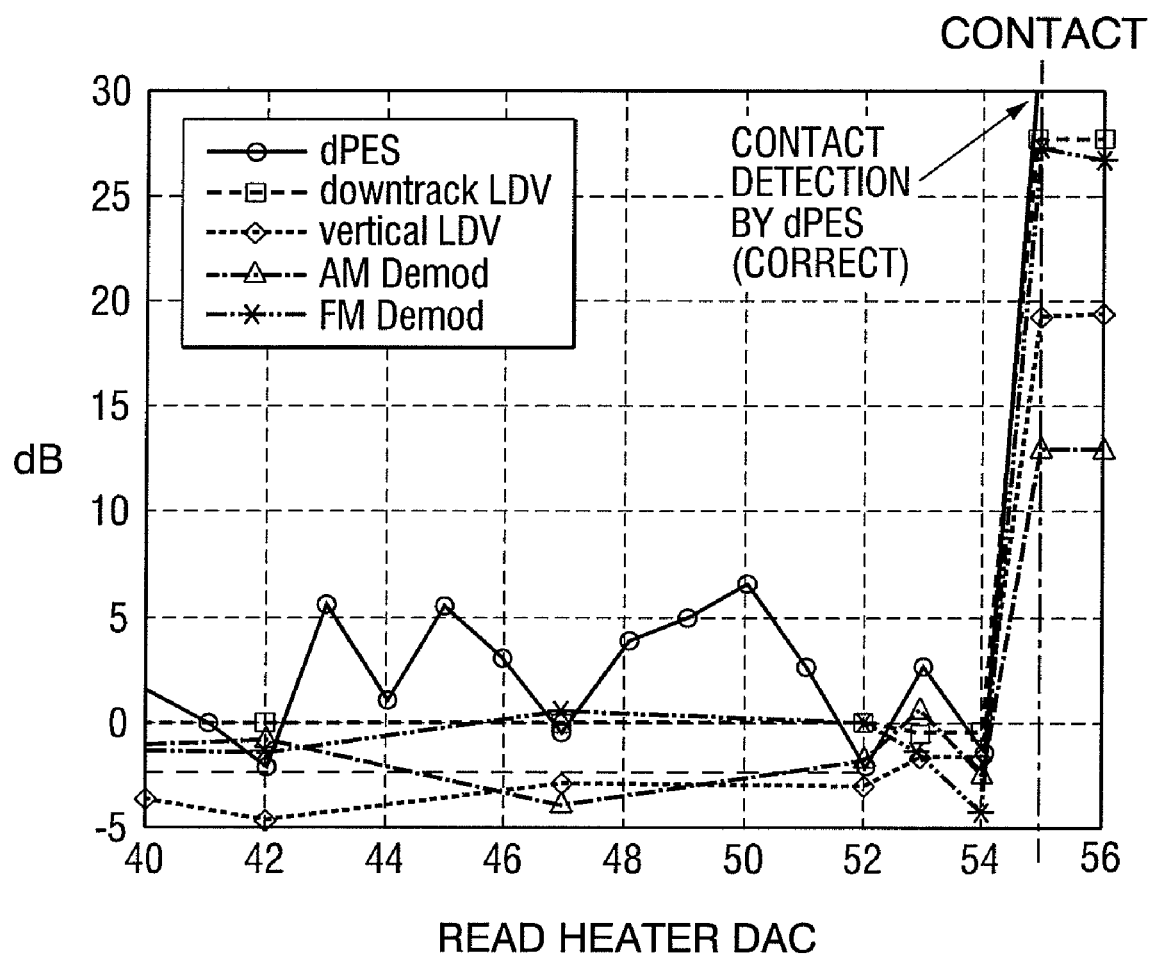

FIGS. 8 and 9 illustrate the contact detection performance comparison between dPES and the AM/FM demodulation-based method. For this measurement, a drive sample with a top cover and frame modification was used to accommodate vertical and down-track Laser Doppler Vibrometers (LDV) as a reference for indicating head-disc contact. Note that the output of the LDV and dPES are both converted into a ratio (in dB) of current value with respect to a nominal value (an output average over three measurements during non-contact) similar to the AM and FM demodulation-based contact detection signals in (2) and (1). That is:

$$downtrackLDV(RDHTR) = 20\log_{20} \frac{downtrackLDV\_AMP_{RDHTR}}{downtrackLDV\_AMP_{NO\_CONTACT}};$$

$$verticalLDV(RDHTR) 20\log_{20} \frac{verticalLDV\_AMP_{RDHTR}}{verticalLDV\_AMP_{NO\_CONTACT}}; \text{ and}$$

$$dPES(RDHTR) = 20\log_{20} \frac{dPES_{RDHTR}}{dPES_{NO\_CONTACT}}.$$

The results in FIGS. 8 and 9 show that at an outer diameter of the disc, both the DPES and AM/FM demodulation methods work well, with an abrupt change (i.e., a high SNR>20 dB for contact detection) at contact. At a medium diameter however, the dPES has a poor signal quality (i.e., a low SNR for contact detection) eventually leading to a 'late detection' in this case. In contrast, the AM and FM demodulation-based methods both provide a strong signal (i.e., >10 dB of change at contact) for contact detection even at a medium diameter, demonstrating that the AM and FM demodulation-based method can effectively detect head-disc contact regardless of skew angles.

Finally, the AM/FM demodulation-based contact detection method has been tested with other drive samples without any modifications for LDV measurement. In these cases, the amount of contact-induced slider motions are not affected by drive top cover and frame modifications as appeared to be the case in the data of FIGS. 8 and 9.

FIG. 10 is a listing of experimental results for several disc drives. The results in FIG. 10 show that at the outer diameter, FM demodulation appears to have a larger signal for contact detection, whereas at a medium diameter, AM demodulation has a larger signal. One explanation is that the fly height modulation becomes larger at the inner radius due to larger disc waviness, which will lead to larger amplitude modulation at head-disc contact. At an outer radius, a large linear velocity of the disc produces a significant impact in the down-track direction during head-disc contact, which will lead to larger frequency modulation.

This suggests that an AM/FM demodulation-based contact detection scheme, in which the AM and FM demodulation outputs are added with different weighting factors depending on the underlying radius, provides a reliable contact detection performance under various head-disc contact conditions.

In addition, the threshold for contact detection can be chosen adaptively for each measurement as, for instance, 3 sigma of the first several outputs during non-head-disc contact condition, while the heater setting is swept from its lowest level until the contact is detected.

Also, the passband in each BPF in FIGS. 4 and 5 can be chosen a priori as a fixed frequency based on slider mechanical modeling. Otherwise, it can be automatically tuned during factory calibration at different zones for each head in every drive.

In various embodiments the method of this invention can provide a reliable head-disc contact detection at any disc location. The method requires a minimum head-disc contact time. In one example for each measurement, the head will contact the disc only for single wedge read time of less than 100 μsec. In addition, the method only requires a very short test time; in one example, ~100 times shorter compared to a dPES method.

The method can additionally provide skew insensitivity because either the vertical or down-track component of contact force is present at all radii. In addition, its fast execution time requires a very short head-disc contact (e.g., for a few data sectors of less than 100 μs, not for a disc revolution of about 8 msec at 7200 rpm drives) because the readback signal is sampled and processed at much higher frequencies (>100 MHz) compared to the PES signal (<100 kHz) in the dPES-based contact detection.

While the invention has been described in terms of several examples, it will be apparent to those skilled in the art that various changes can be made to the disclosed examples without departing from the scope of the invention as defined by the following claims. The implementations described above and other implementations are within the scope of the claims.

What is claimed is:

1. A method comprising:
   producing a readback signal using a recording head positioned adjacent to a recording medium;
   amplitude demodulating the readback signal to produce an amplitude demodulated signal;
   frequency demodulating the readback signal to produce a frequency demodulated signal; and
   using the amplitude demodulated signal and the frequency demodulated signal to determine contact of the recording head with the recording medium.

2. The method of claim 1, wherein the step of using the amplitude demodulated signal and the frequency demodulated signal to determine contact of the recording head with the recording medium comprises:
   combining the amplitude demodulated signal and the frequency demodulated signal to produce a combined signal;
   comparing the combined signal to a threshold; and
   providing a contact signal when the combined signal exceeds the threshold.

3. The method of claim 2, further comprising:
   scaling the amplitude demodulated signal and scaling the frequency demodulated signal prior to the combining step.

4. The method of claim 3, wherein the step of scaling the amplitude demodulated signal and scaling the frequency demodulated signal comprises:
   multiplying the amplitude demodulated signal by a first scaling factor; and
   multiplying the frequency demodulated signal by a second scaling factor, wherein the first and second scaling factors change when the recording head is positioned at different locations adjacent to a recording medium.

5. The method of claim 2, wherein the threshold is established based on a plurality of initial values of the combined signal.

6. The method of claim 1, wherein the step of producing a readback signal using a recording head positioned adjacent to a recording medium is repeated at a plurality of fly heights of the recording head, and the remaining steps of claim 1 are repeated for each fly height.

7. The method of claim 1, wherein the step of producing a readback signal using a recording head positioned adjacent to a recording medium comprises:
   reading data representative of a single tone.

8. The method of claim 1, wherein the step of amplitude demodulating the readback signal to produce an amplitude demodulated signal comprises:
   filtering the readback signal using a plurality of bandpass filters to produce a plurality of filtered signals;
   determining an amplitude of each of the filtered signals; and
   combining the amplitudes of the filtered signals to produce a vertical head motion estimate.

9. The method of claim 1, wherein the step of frequency demodulating the readback signal to produce a frequency demodulated signal comprises:
   using the readback signal to produce a timing error signal;
   filtering the timing error signal using a plurality of bandpass filters to produce a plurality of filtered signals;
   determining an amplitude of each of the filtered signals; and
   combining the amplitudes of the filtered signals to produce a down-track head motion estimate.

10. The method of claim 1, wherein the step of using the amplitude demodulated signal and the frequency demodulated signal to determine contact of the recording head with the recording medium comprises:
    combining the amplitude demodulated signal and the frequency demodulated signal to produce a combined signal;
    calculating a contact detection signal from the combined signal;
    comparing the contact detection signal to a threshold; and
    providing a contact signal when the contact detection signal exceeds the threshold.

11. The method of claim 1, wherein the contact detection signal is calculated as a logarithm of a ratio of a current value of the combined signal to a reference value based on previous values of the combined signal.

12. An apparatus comprising:
    a recording head positioned adjacent to a recording medium and producing a readback signal;
    an amplitude demodulator for amplitude demodulating the readback signal to produce an amplitude demodulated signal;
    a frequency demodulator for frequency demodulating the readback signal to produce a frequency demodulated signal; and
    circuitry for using the amplitude demodulated signal and the frequency demodulated signal to determine contact of the recording head with the recording medium.

13. The apparatus of claim 12, wherein the circuitry comprises:
    a combiner for combining the amplitude demodulated signal and the frequency demodulated signal to produce a combined signal; and
    a comparator for comparing the combined signal with a threshold to determine contact of the recording head with the recording medium.

14. The apparatus of claim 13, wherein the circuitry further comprises:
    a first scaling device for scaling the amplitude demodulated signal; and
    a second scaling device for scaling the frequency demodulated signal.

15. The apparatus of claim 13, further comprising:
    a processor for calculating a contact detection signal from the combined signal; and
    a comparator for comparing the contact detection signal to a threshold.

16. The apparatus of claim 15, wherein the contact detection signal is calculated as a logarithm of a ratio of a current value of the combined signal to a reference value based on previous values of the combined signal.

17. The apparatus of claim 12, wherein the readback signal is produced at a plurality of fly heights of the recording head.

18. An apparatus of claim 12, wherein the circuitry for using the amplitude demodulated signal and the frequency demodulated signal to determine contact of the recording head with the recording medium comprises:
    a plurality of bandpass filters for filtering the readback signal to produce a plurality of filtered signals;
    a plurality of amplitude detectors for determining an amplitude of each of the filtered signals; and
    a summer for combining the amplitudes of the filtered signals to produce a vertical head motion estimate.

19. The apparatus of claim 12, wherein the circuitry for using the amplitude demodulated signal and the frequency demodulated signal to determine contact of the recording head with the recording medium comprises:
  a phase locked loop for producing a timing error signal;
  a plurality of bandpass filters for filtering the timing error signal to produce a plurality of filtered signals;
  a plurality of amplitude detectors for determining an amplitude of each of the filtered signals; and
  a summer for combining the amplitudes of the filtered signals to produce a down-track head motion estimate.

\* \* \* \* \*